US006437062B1

(12) United States Patent
Maddox et al.

(10) Patent No.: US 6,437,062 B1
(45) Date of Patent: *Aug. 20, 2002

(54) GAS PHASE OLEFIN POLYMERIZATION PROCESS

(75) Inventors: Peter James Maddox, Staines (GB); Peter Sefton Williams, Aix en Provence (FR)

(73) Assignee: BP Chemicals Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,974

(22) Filed: Jul. 9, 1999

Related U.S. Application Data

(63) Continuation of application No. PCT/GB98/00039, filed on Jan. 7, 1998.

(30) Foreign Application Priority Data

Jan. 13, 1997 (EP) .............................. 97430001

(51) Int. Cl.$^7$ .............................. C08F 2/34; C08F 4/642; C08F 4/643
(52) U.S. Cl. ...................... 526/126; 526/129; 526/130; 526/134; 526/161; 526/172; 526/901; 526/67; 526/68; 526/69; 526/70
(58) Field of Search .............................. 526/67, 68, 69, 526/70, 126, 901, 129, 160, 161, 943, 130, 172, 134

(56) References Cited

U.S. PATENT DOCUMENTS

| 5,028,670 | A | * | 7/1991 | Chinh et al. | 526/73 |
| 5,055,438 | A | * | 10/1991 | Canich | 502/117 |
| 5,183,867 | A | * | 2/1993 | Welborn, Jr. | 526/114 |
| 5,317,036 | A | * | 5/1994 | Brady et al. | 523/223 |
| 5,405,922 | A | * | 4/1995 | DeChellis et al. | 526/68 |
| 5,462,999 | A | * | 10/1995 | Griffin et al. | 526/68 |
| 5,763,543 | A | * | 6/1998 | Muhle et al. | 526/68 |
| 5,863,853 | A | * | 1/1999 | Vaughan et al. | 502/108 |
| 5,948,871 | A | * | 9/1999 | Goode et al. | 526/86 |

FOREIGN PATENT DOCUMENTS

| WO | WO 94/28032 | 12/1994 |
| WO | WO 96/20780 | 7/1996 |

* cited by examiner

Primary Examiner—David W. Wu
Assistant Examiner—R. Rabago
(74) Attorney, Agent, or Firm—Finnegan, Henderson, Farabow, Garrett and Dunner, L.L.P.

(57) ABSTRACT

A process for the polymerization of olefins in a gas phase reactor operating in a non-condensed mode, in which the process is carried out in the presence of a catalyst system containing (a) a metallocene supported on a solid support and (b) an activator, and adding a lower alkane to the gas phase reactor.

23 Claims, No Drawings

GAS PHASE OLEFIN POLYMERIZATION PROCESS

This application is a continuation of International Application No. PCT/GB98/00039, filed Jan. 7, 1998 the content of which is incorporated herein by reference.

FIELD OF THE INVENTION

The present invention relates to a polymerisation process in particular to a gas phase process for the polymerisation of olefins using a catalyst system comprising an activated metallocene complex.

BACKGROUND OF THE INVENTION

Catalysts based on metallocene complexes have been widely used for the polymerisation of olefins. These complexes are used in catalyst systems typically comprising a bis(cyclopentadienyl) transition metal as the complex and a cocatalyst. Such bis (Cp) transition metal complexes are referred to as metallocenes and are typically based on titanium or zirconium metals and when used are cocatalysed with aluminium compounds such as aluminoxanes. When used in gas phase processes such bis (Cp) metallocene systems may be supported on silica. Such catalyst systems are described in EP 129368 and EP 206794.

More recently another type of transition metal complex has been used to prepare olefin polymers. Such complexes have a single cyclopentadienyl ring ligand and a hetero atom bonded to the metal atom and may also be used in conjunction with aluminoxanes. These complexes are referred to as having a 'constrained geometry' and are described in EP 420436 and EP 416815.

Similar catalyst systems are taught in EP 418044 and WO 92/00333. In these systems the catalyst system comprises a mono(cyclopentadienyl) heteroatom metal complex and an ionic activator compound and such systems have been referred to as ionic mono(cyclopentadienyl) catalysts. Typical ionic activators for such systems may be exemplified by borates.

WO 95/00526 describes titanium or zirconium complexes in which the transition metal is in the +2 formal oxidation state. The complex also comprises a neutral, conjugated or non-conjugated diene ligand which forms a π-complex with the metal. Such complexes are rendered catalysts by combination with an activating cocatalyst for example aluminoxanes, boranes or borates. When used in a gas phase polymerisation process such catalysts are also suitably supported on silica.

Another type of catalyst system is described in WO 96/04290. Here the metallocene complex is represented by a bis(Cp) complex but which also comprises conjugated dienes which may be associated with the metal as a π-complex or σ-complex.

Metallocene complexes have been disclosed as suitable for use in processes for the polymerisation of olefins in the gas phase. For example EP 206794, EP 696293, EP 719289, EP 802202, EP 659773, EP 593083 and EP 739360 disclose the use of metallocene complexes in the gas phase.

SUMMARY OF THE INVENTION

We have now surprisingly found that in gas phase processes using activated metallocene catalyst systems an improvement in catalytic activity may be obtained by the injection of an inert liquid into the reactor.

In particular we found that the use of lower alkanes are particularly suitable for this purpose.

Thus according to the present invention there is provided a process for the polymerisation of olefins in the gas phase said process being carried out in the presence of a catalyst system comprising (a) a metallocene and (b) an activator characterised in that a lower alkane is added to the gas phase reactor operating in non-condensed mode.

The alkane is added preferably directly to the reactor.

DESCRIPTION OF PREFERRED EMBODIMENTS

Titanium (II) or zirconium (II) complexes are particularly suitable as the metallocene for use in the process of the present invention. Such complexes are disclosed in the aforementioned WO 95/00526 which is incorporated herein by reference. The complexes have the general formula:

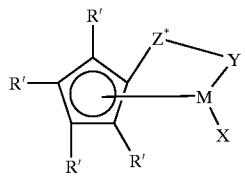

wherein:

R' each occurrence is independently selected from hydrogen, hydrocarbyl, silyl, germyl, halo, cyano, and combinations thereof, said R' having up to 20 non hydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$- bonded diene group having up to 30 non-hydrogen atoms, which forms a $\eta$-complex with M;

Y is —O—, —S—, —NR*—, —PR*—;

M is titanium or zirconium in the +2 formal oxidation state;

Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$; wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* group from Z* (when R* is not hydrogen), or an R* group from Z* and an R* group from Y form a ring system.

Most preferred complexes are amidosilane or amidoalkanediyl complexes wherein the metal is titanium.

Highly preferred diene groups are 1,4-diphenyl-1,3-butadiene, 1,3-pentadiene, 1,4-dibenzyl-1,3-butadiene, 3-methyl-1,3-pentadiene.

Illustrative but not limiting examples of complexes preferred are (tert-butylamido) (tetramethyl-η5-cyclopentadienyl) dimethyl silane titanium (II) 1,4-diphenyl-1,3 -butadiene, (tert-butylamido) (tetramethyl-η5-cyclopentadienyl) dimethyl silane titanium (II) 1,3-pentadiene, (tert-butylamido) (2-methylindenyl) dimethylsilanetitanium (II) 1,4-diphenyl-1,3-butadiene.

These complexes are rendered catalytically active by combination with an activating cocatalyst. Suitable cocatalysts include aluminoxanes, especially methylaluminoxane (MAO) or strong Lewis acids eg tri (hydrocarbyl) boron compounds or halogenated derivatives.

A particularly preferred activator is tris (pentafluorophenyl) boron.

Other complexes suitable for use in the process of the present invention are those in which the metal is in a higher valency state. Such complexes are disclosed in EP 416815 and EP 491842 both of which are incorporated herein by reference. The complexes have the general formula:

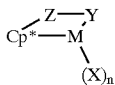

wherein:

Cp* is a single η5-cyclopentadienyl or η5-substituted cyclopentadienyl group optionally covalently bonded to M through —Z—Y— and corresponding to the formula:

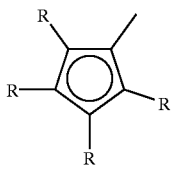

wherein R each occurrence is hydrogen or a moiety selected from halogen, alkyl, aryl, haloalkyl, alkoxy, aryloxy, silyl groups, and combinations thereof of up to 20 non-hydrogen atoms, or two or more R groups together form a fused ring system;

M is zirconium, titanium or hafnium bound in an η5 bonding mode to the cyclopentadienyl or substituted cyclopentadienyl group and is in a valency state of +3 or +4.

X each occurrence is hydride or a moiety selected from halo, alkyl, aryl, silyl, germyl, aryloxy, alkoxy, amide, siloxy, and combinations thereof (e.g. haloalkyl, haloaryl, halosilyl, alkaryl, aralkyl, silylalkyl, aryloxyaryl, and alkyoxyalkyl, amidoalkyl, amidoaryl) having up to 20 non-hydrogen atoms, and neutral Lewis base ligands having up to 20 non-hydrogen atoms;

n is 1 or 2 depending on the valence of M;

Z is a divalent moiety comprising oxygen, boron, or a member of Group 14 of the Periodic Table of the Elements;

Y is a linking group covalently bonded to the metal comprising nitrogen, phosphorus, oxygen or sulfur, or optionally Z and Y together form a fused ring system.

Most preferred complexes are those wherein Y is a nitrogen or phosphorus containing group corresponding to the formula (—NR$^1$) or (—PR$^1$) wherein R$^1$ is C$_1$–C$_{10}$ alkyl or C$_6$–C$_{10}$ aryl and wherein Z is SiR"$_2$, CR"$_2$, SiR"$_2$ SiR"$_2$, CR"=CR" or GeR"$_2$ in which R" is hydrogen or hydrocarbyl.

Most preferred complexes are those wherein M is titanium or zirconium.

Illustrative, but not limiting examples of suitable complexes are (tert-butylamido) (tetramethyl-η5-cyclopentadienyl) dimethyl silanetitanium dimethyl, (tert-butylamido) dibenzyl (tetramethyl-η5-cyclopendienyl) silane zirconium dibenzyl, (benzylamido) dimethyl (tetramethyl-η5-cyclopentadienyl) silane titanium dichloride, (phenylphosphido) dimethyl (tetramethyl-η5-cyclopentadienyl) silane zirconium dibenzyl and the like.

These complexes are rendered catalytically active by combination with an activating cocatalyst. Suitable cocatalysts include aluminoxanes, especially methylaluminoxane (MAO) or strong Lewis acids eg tri (hydrocarbyl) boron compounds or halogenated derivatives.

Particularly suitable as an activator is tris (pentafluorophenyl) boron.

Also suitable for use in the process according to the present invention are metallocene complexes having the general formula:

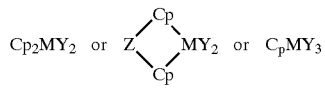

wherein

M is Zr, Ti or Hf

Y is an univalent ligand

Cp is an unsubstituted or substituted cyclopentadienyl ligand, and

Z is a bridging group.

Typically the Y group is halogen or alkyl and the cyclopentadienyl ligand may be substituted by alkyl groups or two substituents may be joined to form a fused ring eg indenyl.

Z is typically alkylene, dialkysilyl or dialkylgermanyl bridging group.

Particularly suitable complexes are for example ethylene bis(indenyl) zirconium dichloride or ethylene bis(indenyl) zirconium dimethyl.

Such metallocene complexes are typically used in the presence of aluminoxane cocatalysts.

Examples of such metallocene complexes suitable for use in the process of the present invention are those disclosed in EP 129368, EP 206794 and EP 260130.

Such bis (Cp) metallocene complexes may also be suitable for use in the process of the present invention when they also comprise diene ligands. Complexes of this type are described in WO 96/04290.

Bis (Cp) metallocene complexes having such diene ligands may be represented by the following formula:

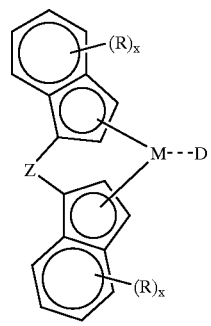

wherein

M is titanium, zirconium or hafnium,

D is a stable conjugated diene optionally substituted with one or more hydrocarbyl groups, silyl groups, hydro carbylsily groups, silylhydrocarbyl groups or mixtures thereof, or may contain a Lewis base functionality, said D having from 4 to 40 non-hydrogen atoms and forming a π- complex with M, Z is a bridging group comprising an alkylene group having 1–20 carbon atoms or a dialkyl silyl- or germanyl group or alkyl phosphine or amino radical, R is hydrogen or alkyl having from 1–10 carbon atoms, and x is 1–6.

Most preferred metallocene complexes in this family are those where, as evidenced by X-ray diffraction or NMR, the D ligand is π-bonded to the M atom in an η5 fashion. Such metallocene complexes are characterised by the M atom being in the +2 oxidation state.

Preferred complexes are those wherein M is zirconium and Z is ethylene ($CH_2CH_2$).

The D ligand is most preferably chosen from the group: s-trans-$\eta^4$, 4-diphenyl-1,3-butadiene; s-trans-$\eta^4$-3-methyl-1,3-pentadiene; s-trans-$\eta^4$-dibenzyl-1,3-butadiene; s-trans-$\eta^4$-2,4-hexadiene; s-trans-$\eta^4$-1,4-ditolyl-1,3-butadiene; s-trans-$\eta^4$-1,4-bis(trimethylsilyl)-1,3-butadiene; s-cis-$\eta^4$-1,4-diphenyl-1,3-butadiene; s-cis-$\eta^4$-3-methyl-1,3-pentadiene; s-cis-$\eta^4$-2,4-hexadiene; s-cis-$\eta^4$2,4-hexadiene; s-cis-$\eta^4$1,3-pentadiene; s-cis-$\eta^4$-1,4-ditolyl-1,3-butadiene; and s-cis-$\eta^4$-1,4-bis(trimethylsilyl)-1,3-butadiene, said s-cis diene group forming a π-complex as defined herein with the metal.

Particularly suitable are externally substituted dienes in particular the 1,4-dipheny substituted butadienes.

These preparation of these complexes is extensively described in WO 96/104290 which also lists examples of suitable representative for use in the present invention.

When the diene group D has a Lewis base functionality this may be chosen from the following groups:

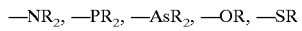
—$NR_2$, —$PR_2$, —$AsR_2$, —OR, —SR

Particularly preferred dienes of this type are dialkylamino phenyl substituted dienes for example 1-phenyl -4 ($N,N^1$-diethylamino phenyl) 1,3-butadiene.

A particularly preferred complex is ethylene bis (indenyl) zirconium (II) 1,4-diphenyl butadiene.

The molar ratio of complex to activator employed in the process of the present invention may be in the range 1:10000 to 100:1. A preferred range is from 1:5000 to 10:1 and is most preferred in the range 1:10 to 1:1.

The alkane may be chosen from the group of lower alkanes consisting of butane, pentane, isopentane or hexane. Preferably the alkane is pentane.

The alkane may be added to the gas phase reactor before addition of the monomer or monomers. Preferably it is added as a liquid at room temperature and is added directly to the reactor Alternatively the alkane may be continuously added in the reactor during the polymerisation process.

The complexes according to the process of the present invention for use in the gas phase may be supported. Alternatively the metallocene complex may be used in an unsupported form.

When supported the support may be any organic or inorganic inert solid. particularly porous supports such as talc, inorganic oxides and resinous support materials such as polyolefins. Suitable inorganic oxide materials which may be used include Group 2, 13, 14 or 15 metal oxides such as silica, alumina, silica-alumina and mixtures thereof. Other inorganic oxides that may be employed either alone or in combination with the silica, alumina or silica-alumina are magnesia, titania or zirconia. Other suitable support materials may be employed such as finely divided polyolefins such as polyethylene.

The most preferred support material for use with the supported catalysts according to the process of the present invention is silica.

It is preferable that the silica is dried before use and this is typically carried out by heating at elevated temperatures for example between 200 and 850 deg.C.

In a preferred protocol the supported catalyst may be prepared by addition of a solution of the activator in a suitable solvent to a slurry of activated silica treated with a trialkylaluminium compound followed by addition of a solution of the metallocene complex in the same solvent. Alternatively the complex may be added to the trialkylaluminium treated silica before addition of the activator.

A suitable solvent for the preparation of the supported catalyst is toluene.

Suitable trialkylaluminium compounds are trimethylaluminium (TMA), triethlyaluminium(TEA) or triisobutylaluminium (TIBAL).

The process according to the present invention is suitable for use in the polymerisation of olefins in particularly in the homopolymerisation of ethylene or the copolymerisation of ethylene with other alpha-olefins in particular those having from 3 to 10 carbon atoms. Most preferred alpha-olefins are 1-butene, 1-hexene and 4-methyl-1-pentene.

The process of the invention may be carried out in any suitable gas phase process.

For example traditional stirred bed reactors may be suitable such as those disclosed in U.S. Pat. No. 3,256,263 and U.S. Pat. No. 4,012,573. However the process according to the present invention is particularly suitable for use in gas phase processes comprising a fluidised bed. In such processes a fluidised bed of growing polymer particles is supported above a fluidisation grid. The bed is maintained in a fluidised state by use of a fluidising medium which comprises a recycled gas stream which passes upwards through the grid.

A particular type of fluidised bed operation utilises the cooling of the recycled gas stream to aid the cooling of the fluidised bed. The cooled recycled stream containing entrained liquid is returned to the fluidised bed beneath the fluidisation grid. For example EP 89691, EP 699212 and EP 784637 disclose such gas phase processes.

Another type of gas phase process is that described in WO 94/28032 in which a recycled gas stream is cooled and separated into a gas stream and a liquid stream. The cooled liquid may be an inert liquid or may be a condensable monomer. The separated liquid stream is introduced directly into the fluidised bed in order to provide a cooling of the bed.

In such fluidised bed processes the alkane may be added to the reactor by any suitable means. For example the alkane may be added directly to the reactor or may be added indirectly for example by addition to the recycle line, catalyst injection system, etc.

The alkane may suitably be added continously to the fluidised bed reactor during the polymerisation process.

With respect to gas phase processes, in particular fluidised bed reactors, the amount of alkene suitable for use in the process according to the present invention may preferably be represented with respect to the weight ratio of alkane to catalyst under steady state conditions. The weight ratio of alkane to catalyst is greater than or equal to 10. The weight ratio is preferably in the range 10–10,000.

Alternatively the amount of alkane may be represented with respect to the weight ratio of alkane to the amount of polymer in the reactor under steady state conditions. The minimum weight ratio of alkane to polymer is 0.010 and the preferred range for the weight ratio of alkane to polymer is 0.010 to 0.5 most preferably in the range 0.018 to 0.5.

The alkane is particularly effective under polymerisation conditions of low comonomer concentrations.

Using the process according to the present invention polymers may be prepared having densities in the range from 0.905 to 0.960 g/cc and a melt index in the range 0.1 to 20 according to ASTM D1238 condition E (2.16 kg. at 190 deg. C).

The present invention will be further illustrated with reference to the following Examples.

EXAMPLE 1
Preparation of Supported Catalyst 1

7.0 kg of Crosfield ES70 silica (activated at 500° C.) were slurried in 110 litres of hexane. 9.32 litres of 0.976M TEA in hexane were added, and the slurry agitated for 2 hours at 30° C. The silica was allowed to settle, and the supernatant hexane removed. The silica was washed several times with hexane, until the concentration of Al in the washing had reached <1 mmol Al/litre. Then the silica was dried in vacuo at 40° C.

50 g of this TEA treated ES70 silica were slurried in 250 ml of dry toluene. 10.4 ml of a 10.7 wt % solution of (tert-butylamido)(tetramethyl-$\eta^5$-cyclopentadienyl) dimethylsilanetitanium penta-1,3-diene in toluene were added, and the mixture shaken vigorously. Then 29.4 ml of a 7.85 wt % solution of tris(pentafluorophenyl)boron in toluene were added. The mixture was shaken well, and then the solvent removed in vacuo at 40° C. to give an olive green powder.

EXAMPLE 2
Preparation of Supported Catalyst 2

2.5 kg of Crosfield ES70 silica (activated at 500° C.) were slurried in 110 litres of hexane. 4.00 litres of 0.976M TEA in hexane were added, and the slurry agitated for 2 hours at 30° C. The silica was allowed to settle, and the supernatant hexane removed. The silica was washed several times with hexane, until the concentration of Al in the washing had reached <1 mmol Al/litre. Then the silica was dried in vacuo at 40° C.

10 g of this TEA treated ES70 silica were slurried in 40 ml of dry toluene. 2.1 ml of a 10.7 wt % solution of(tert-butylamido)(tetramethyl-$\eta^5$-cyclopentadienyl) dimethylsilanetitanium penta-1,3-diene in toluene were added, and the mixture shaken vigorously. Then 5.9 ml of a 7.85 wt % solution of tris(pentafluorophenyl)boron in toluene were added. The mixture was shaken well, and then the solvent removed in vacuo at 40° C. to give an olive green powder.

EXAMPLE 3
Polymerisation.

347 g of NaCl was added to a 2.5 litre volume agitated dry phase reactor, which had been previously baked out at 85° C. under a $N_2$ purge. The reactor was cooled to 25° C. and 5 ml of dry pentane was added to the reactor. The reactor was sealed and the temp. raised to 85° C. 1.19 g of a TIBAL treated silica was added to the reactor, and this was agitated for 15 minutes. The reactor was cooled to 70° C., and 6.5 bar $C_2H_4$ added. Then $H_2$ and 1-hexene were admitted to the reactor. A mixture of 0.309 g of catalyst prepared from example 1 and 0.912 g of a TIBAL treated silica was injected into the reactor with high pressure $N_2$. The temperature, $C_2H_4$ pressure and $H_2$ and 1-hexane levels were maintained constant during the rest of the test. The total polymerisation time was 233 minutes. During the test, the average $H_2/C_2H_4$ ratio was 0.0038 and the average 1-hexene/$C_2H_4$ ratio was 0.0062. The reactor was vented and cooled, and 262 g of polymer was recovered after washing off the salt, giving an activity of 33.6 g/g cat.h.bar. The polymer density was 0.9175 g/ml and M1(2.16) was 2.10.

EXAMPLE 4
Polymerisation 289 g of NaCl was added to a 2.5 litre volume agitated dry phase reactor, which had been previously baked out at 85° C. under a $N_2$ purge. The reactor was cooled to 25° C. and 5 ml of dry pentane was added to the reactor. The reactor was sealed and the temp. raised to 85° C., 1.30 g of a TIBAL treated silica was added to the reactor, and this was agitated for 15 minutes. The reactor was cooled to 70° C., and 6.5 bar $C_2H_4$ added. Then $H_2$ and 1-hexene were admitted to the reactor A mixture of 0.217 g of catalyst prepared from example 1 and 0.853 g of a TIBAL treated silica was injected into the reactor with high pressure $N_2$. The temperature, $C_2H_4$ pressure and $H_2$ and 1-hexene levels were maintained constant during the rest of the test. The total polymerisation time was 105 minutes. During the test, the average $H_2/C_2/H_4$ ratio was 0.0040 and the average 1-hexene/$C_2H_4$ ratio was 0.0060. The reactor was vented and cooled, and 144 g of polymer was recovered after washing off the salt, giving an activity of 43.8 g/g cat.h.bar. The polymer density was 0.9175 g/ml and M1(2.16) was 3.10.

EXAMPLE 5
(Comparative)

344 g of NaCl was added to a 2.5 litre volume agitated dry phase reactor, which had been previously baked out at 85° C. under a $N_2$ purge. 1.30 g of a TIBAL treated silica was added to the reactor, and this was agitated for 15 minutes. The reactor was cooled at 70° C., and 6.5 bar $C_2H_4$ added Then $H_2$ and 1-hexene were admitted to the reactor. A mixture of 0.213 g of catalyst prepared from Example 1 and 0.781 g of a TIBAL treated silica was injected into the reactor with high pressure $N_2$. The temperature, $C_2H_4$ pressure and $H_2$ and 1-hexene levels were maintained constant during the rest of the test. The total polymerisation time was 166 minutes. During the test, the average $H_2/C_2H_4$ ratio was 0.0039 and the average 1-hexene/$C_2H_4$ ratio was 0.0053. The reactor was vented and cooled, and 101 g of polymer was recovered after washing off the salt, giving an activity of 26.3 g/g cat.h.bar.

EXAMPLE 6
Polymerisation 273 g of NaCl was added to a 2.5 litre volume agitated dry phase reactor, which had been previously baked out at 85° C. under a $N_2$ purge. The reactor was cooled to 25° C. and 5 ml of dry pentane was added to the reactor. The reactor was sealed and the temp. raised to 85° C. 1.21 g of a TIBAL treated silica was added to the reactor, and this was agitated for 15 minutes. The reactor was cooled to 70° C., and 6.5 bar C2H4 added. Then $H_2$ and 1-hexene were admitted to the reactor. A mixture of 0.217 g of catalyst prepared from Example 2 and 0.755 g of a TIBAL treated silica was injected into the reactor with high pressure $N_2$. The temperature, $C_2H_4$ pressure and $H_2$ and 1-hexene levels were maintained constant during the rest of the test. The total polymerisation time was 132 minutes. During the test, the average $H_2/C_2H_4$ ratio was 0.0042 and the average 1-hexene/$C_2H_4$ ratio was 0.0044. The reactor was vented and cooled, and 122 g of polymer was recovered after washing off the salt, giving an activity of 39.3 g/g cat.h.bar. The polymer density was 0.918 g/ml and M1(2.16) was 4.4.

EXAMPLE 7
(Comparative)

322 g of NaCl was added to a 2.5 litre volume agitated dry phase reactor, which had been previously baked out at 85° C. under a $N_2$ purge. 1.19 g of a TIBAL treated silica was added to the reactor, and this was agitated for 15 minutes. The reactor was cooled to 70° C., and 6.5 bar $C_2H_4$ added. Then $H_2$ and 1-hexene were admitted to the reactor. A mixture of 0.220 g of catalyst prepared from example 2 and 0.754 g of a TIBAL treated silica was injected into the reactor with high pressure $N_2$. The temperature, $C_2H_4$ pressure and $H_2$ and 1-hexene levels were maintained constant during the rest of the test. The total polymerisation time was 123 minutes. During the test, the average $H_2/C_2H_4$ ratio was 0.0035 and the average 1-hexene/$C_2H_4$ ratio was 0.0037. The reactor was vented and cooled, and 85 g of polymer was recovered after washing off the salt, giving an activity of 29.0 g/g cat.h.bar. The polymer density was 0.919 g/ml and M1(2.16) was 0.8.

What is claimed is:

1. A process for the polymerisation of olefins in a gas phase reactor operating in a non-condensed mode, which comprises carrying out the process in the presence of a catalyst system containing (a) a metallocene supported on a solid support and (b) an activator, and adding a lower alkane to the gas phase reactor, wherein the metallocene has the formula:

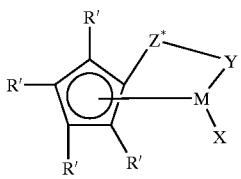

wherein:
  R' each occurrence is independently selected from hydrogen, hydrocarbyl, silyl, germyl, halo, cyano, and combinations thereof, said R' having up to 20 non hydrogen atoms, and optionally, two R' groups (where R' is not hydrogen, halo or cyano) together form a divalent derivative thereof connected to adjacent positions of the cyclopentadienyl ring to form a fused ring structure;
  X is a neutral $\eta^4$-bonded diene group having up to 30 non-hydrogen atoms, which forms a π-complex with M;
  Y is —O—, —S—, —NR*—, —PR*—;
  M is titanium or zirconium in the +2 formal oxidation state;
  Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$;
    R* each occurrence is independently hydrogen, or a member selected from hydrocarbyl, silyl, halogenated alkyl, halogenated aryl, and combinations thereof, said R* having up to 10 non-hydrogen atoms, and optionally, two R* group from Z* (when R* is not hydrogen), or an R* group from Z* and an R* group from Y form a ring system.

2. The process according to claim 1, wherein the lower alkane is chosen from the group consisting of butane, pentane, isopentane or hexane.

3. The process according to claim 2, wherein the lower alkane is pentane.

4. The process according to claim 1, wherein the alkane is added directly to the reactor.

5. The process according to claim 1, wherein the alkane is added to the reactor as a liquid.

6. The process according to claim 1, wherein the activator is tris(pentafluorophenyl) boron.

7. The process according to claim 1, wherein the metallocene is supported on silica.

8. The process according to claim 1, wherein the polymerization process is carried out in a fluidized bed reactor.

9. The process according to claim 8, wherein the alkane is added continuously to the fluidized bed reactor.

10. The process according to claim 1, wherein the weight ratio of alkane to catalyst under steady state conditions is in the range 10–10,000.

11. The process according to claim 1, wherein the weight ratio of alkane to polymer in the reactor under steady state conditions is in the range of 0.010 to 0.05.

12. The process according to claim 11, wherein the weight ratio of alkane to polymer in the reactor is in the range 0.018 to 0.5.

13. A process for the polymerisation of olefins in a gas phase reactor operating in a non-condensed mode, which comprises carrying out the process in the presence of a catalyst system containing (a) a metallocene supported on a solid support and (b) an activator, and adding a lower alkane which is pentane or isopentane to the gas phase reactor, wherein the metallocene has the formula:

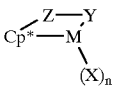

wherein:
  Cp* is a single η5-cyclopentadienyl or η5-substituted cyclopentadienyl group optionally covalently bonded to M through -Z-Y- and corresponding to the formula:

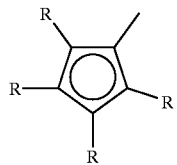

wherein R each occurrence is hydrogen or a moiety selected from halogen, alkyl, aryl, haloalkyl, alkoxy, aryloxy, silyl groups, and combinations thereof of up to 20 non-hydrogen atoms, or two or more R groups together form a fused ring system;
  M is zirconium, titanium or hafnium bound in an η5 bonding mode to the cyclopentadienyl or substituted cyclopentadienyl group and is in a valency state of +3 or +4.
  X each occurrence is hydride or a moiety selected from halo, alkyl, aryl, silyl, germyl, aryloxy, alkoxy, amide, siloxy, and combinations thereof having up to 20 non-hydrogen atoms, and neutral Lewis base ligands having up to 20 non-hydrogen atoms;
  n is 1 or 2 depending on the valence of M;
  Z is a divalent moiety comprising oxygen, boron, or a member of Group 14 of the Periodic Table of the Elements;
  Y is a linking group covalently bonded to the metal comprising nitrogen, phosphorus, oxygen or sulfur, or optionally Z and Y together form a fused ring system.

14. The process according to claim 13, wherein the lower alkane is pentane.

15. The process according to claim 13, wherein the alkane is added directly to the reactor.

16. The process according to claim 13, wherein the alkane is added to the reactor as a liquid.

17. The process according to claim 13, wherein the activator is tris(pentafluorophenyl) boron.

18. The process according to claim 13, wherein the metallocene is supported on silica.

19. The process according to claim 13, wherein the polymerization process is carried out in a fluidized bed reactor.

20. The process according to claim 19, wherein the alkane is added continuously to the fluidized bed reactor.

21. The process according to claim 13, wherein the weight ratio of alkane to catalyst under steady state conditions is in the range 10–10,000.

22. The process according to claim 13, wherein the weight ratio of alkane to polymer in the reactor under steady state conditions is in the range 0.010 to 0.5.

23. The process according to claim 21, wherein the weight ratio of alkane to polymer in the reactor is in the range of 0.018 to 0.5.

* * * * *

UNITED STATES PATENT AND TRADEMARK OFFICE
CERTIFICATE OF CORRECTION

PATENT NO. : 6,437,062 B1
DATED : August 20, 2002
INVENTOR(S) : Peter James Maddox et al.

It is certified that error appears in the above-identified patent and that said Letters Patent is hereby corrected as shown below:

Column 9,
Line 45, after "$GeR^*_2$" insert -- wherein: --.

Column 10,
Line 45, "+4." should read -- +4; --.

Signed and Sealed this

Eighteenth Day of February, 2003

JAMES E. ROGAN
*Director of the United States Patent and Trademark Office*